United States Patent [19]

Ehsani

[11] Patent Number: 5,586,613
[45] Date of Patent: Dec. 24, 1996

[54] ELECTRICALLY PEAKING HYBRID SYSTEM AND METHOD

[75] Inventor: Mehrdad Ehsani, Bryan, Tex.

[73] Assignee: The Texas A&M University System, College Station, Tex.

[21] Appl. No.: 312,438

[22] Filed: Sep. 26, 1994

Related U.S. Application Data

[63] Continuation of Ser. No. 51,156, Apr. 22, 1993, abandoned.

[51] Int. Cl.⁶ .................................................. B60K 6/04
[52] U.S. Cl. ................................. 180/65.2; 318/139
[58] Field of Search .............................. 123/352, 399; 290/9; 180/65.1, 65.2, 65.3, 65.4, 65.8; 318/139

[56] References Cited

U.S. PATENT DOCUMENTS

| | | | |
|---|---|---|---|
| 3,493,066 | 2/1970 | Dooley | 180/54 |
| 3,732,751 | 5/1973 | Berman et al. | 74/675 |
| 3,791,473 | 2/1974 | Rosen | 180/65.2 |
| 3,792,327 | 2/1974 | Waldorf | 318/139 |
| 3,837,419 | 9/1974 | Nakamura | 180/65 |
| 3,842,287 | 10/1974 | Nakamura | 290/16 |
| 3,888,325 | 6/1975 | Reinbeck | 180/65 |
| 3,898,893 | 8/1975 | Hashimoto et al. | 74/859 |
| 3,923,115 | 12/1975 | Helling | 180/65 |
| 4,042,056 | 8/1977 | Horwinski | 180/65 |
| 4,165,795 | 8/1979 | Lynch et al. | 180/65 |
| 4,187,436 | 2/1980 | Etienne | 290/27 |
| 4,187,741 | 2/1980 | Nyman | 74/751 |
| 4,216,420 | 8/1980 | Jinbo et al. | 318/370 |
| 4,305,254 | 12/1981 | Kawakatsu et al. | 180/65.2 X |
| 4,313,080 | 1/1982 | Park | 320/61 |
| 4,351,405 | 9/1982 | Fields et al. | 180/65 |
| 4,407,132 | 10/1983 | Kawakatsu et al. | 60/716 |
| 4,438,342 | 3/1984 | Kenyon | 290/45 |
| 4,533,011 | 8/1985 | Heidemeyer et al. | 180/65 |
| 4,588,040 | 5/1986 | Albright, Jr. et al. | 180/165 |
| 4,591,016 | 5/1986 | Matthews | 180/165 |
| 4,923,025 | 5/1990 | Ellers | 180/65.2 |
| 5,053,632 | 10/1991 | Suzuk et al. | 180/65.2 X |
| 5,213,077 | 5/1993 | Nishizawa et al. | 123/352 |

*Primary Examiner*—Brian L. Johnson
*Assistant Examiner*—Michael Mar
*Attorney, Agent, or Firm*—Baker & Botts, L.L.P.

[57] ABSTRACT

A series hybrid electric-combustion system is provided which includes an engine (16) operable to generate mechanical energy and translate it to a drive shaft (21). A battery (24) is included that is operable to store electrical energy and to deliver electrical energy. Also provided is a electric machine (18) mechanically coupled to engine (16) and electrically coupled to battery (24). Electric machine (18) has two modes of operations. In the first mode it translates electrical energy from battery (24) into additional mechanical energy at drive shaft (21). In the second mode of operation, electric machine (18) delivers electrical energy to battery (24) for storage. Converter (22) is also included in the system to convert the electrical energy from electric machine (18) for storage and battery (24) and also for converting electrical energy from battery (24) for use by electric machine 18. The system also includes command (12) for inputting system power requirements and controller (14) to control converter (22) and engine (16) in the modes of operation of the system.

8 Claims, 3 Drawing Sheets

ELECTRICALLY PEAKING HYBRID SYSTEM AND METHOD

CROSS REFERENCE TO RELATED APPLICATIONS

This application is a continuation of application Ser. No. 08/051,156 filed Apr. 22, 1993, entitled "ELECTRICALLY PEAKING HYBRID SYSTEM AND METHOD" by Mehrdad Ehsani, now abandoned.

TECHNICAL FIELD OF THE INVENTION

This invention relates generally to the field of electrical-mechanical systems, and more particularly to an electrically peaking hybrid system and method of generating hybrid electric-combustion power.

BACKGROUND OF THE INVENTION

Technical publications describing developments in technology for electric vehicles are abundant. Some, however, fail to recognize the fundamental limitations in the performance of the electric vehicle in comparison to the internal combustion engine (ICE). Thus, most of the improvements reported are of a short term, single issue nature and fail to address the overall vehicle as a commercial product that is to be competitive with the ICE vehicle. Because of the performance advantages to the ICE, transportation will continue to depend primarily on some form of internal combustion for many years to come.

The electric vehicle does present, however, certain important advantages. For example, electric vehicles are suitable for applications that require zero emissions. There is a growing recognition that the discharge from ICE vehicles is a significant contributor to the global atmospheric degradation. To make a short term impact in reducing the atmospheric contamination caused by ICE vehicle exhaust emissions in urban areas, electric vehicles have been mandated by law in some places in this country and around the world. However, this requirement can only be met with sacrifices of performance and at a cost premium, when compared to the conventional ICE vehicle.

Limitations in electric storage batteries present the greatest obstacle to the development of an all electric vehicle that is cost and performance competitive with the ICE vehicle. While progress has been made in battery development, it appears that chemical-electrical storage batteries cannot match the energy storage density and convenience of today's petroleum-based fuels.

The design of an all electric vehicle is driven by the need to minimize the load on the limited battery supply. This has forced extreme designs to reduce road friction, aerodynamic drag, vehicle weight and power requirements of the various auxiliary systems. Since no significant improvement in battery performance is expected for the near future, these design constraints tend to force the introduction of undesirable vehicle tradeoffs. This, in turn, can lead to user dissatisfaction, which can adversely affect the long-term acceptability of the electric vehicle concept.

The present state of the art in electric motor drives has reached a level of maturity. A high level of development has also been reached in batteries and microcomputer controls. However, to have both suitable range and performance, the electric vehicle needs to incorporate some additional energy source. The hybrid electric vehicle is presently the best solution with the existing technology.

The drive train of the conventional ICE automobile consists of an engine, a transmission and a drive shaft that connects to the wheel axle. All of the required power and torque are supplied by the engine at all times. The engine is sized to deliver the maximum power that the driver is likely to ask for, even though most of the time the driver requires much less than the maximum power. This makes the engine much larger than the average demand required. The basic problem with such a large engine is that most of the time it will be running at far less than its maximum power, and therefore below its maximum efficiency. Having a large engine and running it far below its optimum efficiency are the two fundamental reasons for the poor fuel economy of the conventional ICE vehicle.

To partially overcome this problem, a transmission is added to the drive train. This helps to match the variations of speed and power of the vehicle to the engine to some extent. However, the transmission introduces its own inefficiencies which are substantial. The result of this conventional design is that a typical American full-size sedan is equipped with an engine of 160 horsepower or larger. Most of the time, however, the vehicle requires less than 30 horsepower to operate in the city or on the highway. At these power levels, the conventional engine is operating at two to four times below its optimum efficiency. This results in an average fuel economy of about 20 miles per gallon.

Today, no hybrid electric-ICE vehicle drive system has been developed that is competitive with the conventional ICE vehicle both in cost and performance. Therefore, a need has arisen for a hybrid electric-ICE vehicle drive system which provides performance and range comparable to conventional ICE vehicles. Furthermore, to be viable, such a system should operate within the existing infrastructure of fuel supply and distribution, make use of existing component technology, and be price and operating cost competitive with conventional ICE vehicles.

SUMMARY OF THE INVENTION

In accordance with the present invention, an electrically peaking hybrid system and method are provided which substantially eliminate or reduce disadvantages and problems associated with prior systems.

In accordance with the teachings of the present invention, a series-mechanical hybrid electric-combustion system is provided that includes an engine to generate mechanical energy. The engine is coupled to a drive mechanism. The system also includes a battery to store and deliver electric energy, and an electric machine coupled to the engine and the battery. The electric machine has two operating modes. In the first mode of operation, the electric machine translates mechanical energy from the engine and electrical energy from the batteries to drive the drive mechanism. In the second mode of operation, the electric machine delivers electrical energy to the battery for storage.

An important technical advantage of the present invention is the reduction in size of the ICE to approximately one quarter the size used in conventional ICE vehicles. Another important technical advantage of the present invention is the series coupling between the drive train, electric machine, and engine, thereby eliminating the need for a transmission and associated power losses. An additional technical advantage of the present invention is its fuel efficiency, which is typically 2.8 times the current ICE vehicle. Another technical advantage of the system of the present invention is that it provides full acceleration and the range of conventional ICE vehicles. Another technical advantage of the present invention is that it can be manufactured from currently available technologies and therefore no research into new technologies is required.

BRIEF DESCRIPTION OF THE DRAWINGS

For a more complete understanding of the present invention and the advantages thereof, reference is now made to the following description taken in conjunction with the accompanying drawings in which the reference numbers indicate like features and wherein.

DETAILED DESCRIPTION OF THE INVENTION

The present invention is illustrated in FIGS. 1–7 of the drawings, like numerals being used to refer to the like and corresponding parts of the various drawings. Throughout the following description the present invention will be discussed in connection with a vehicle, it being understood that the present invention may also be included in other applications.

Figure 1:
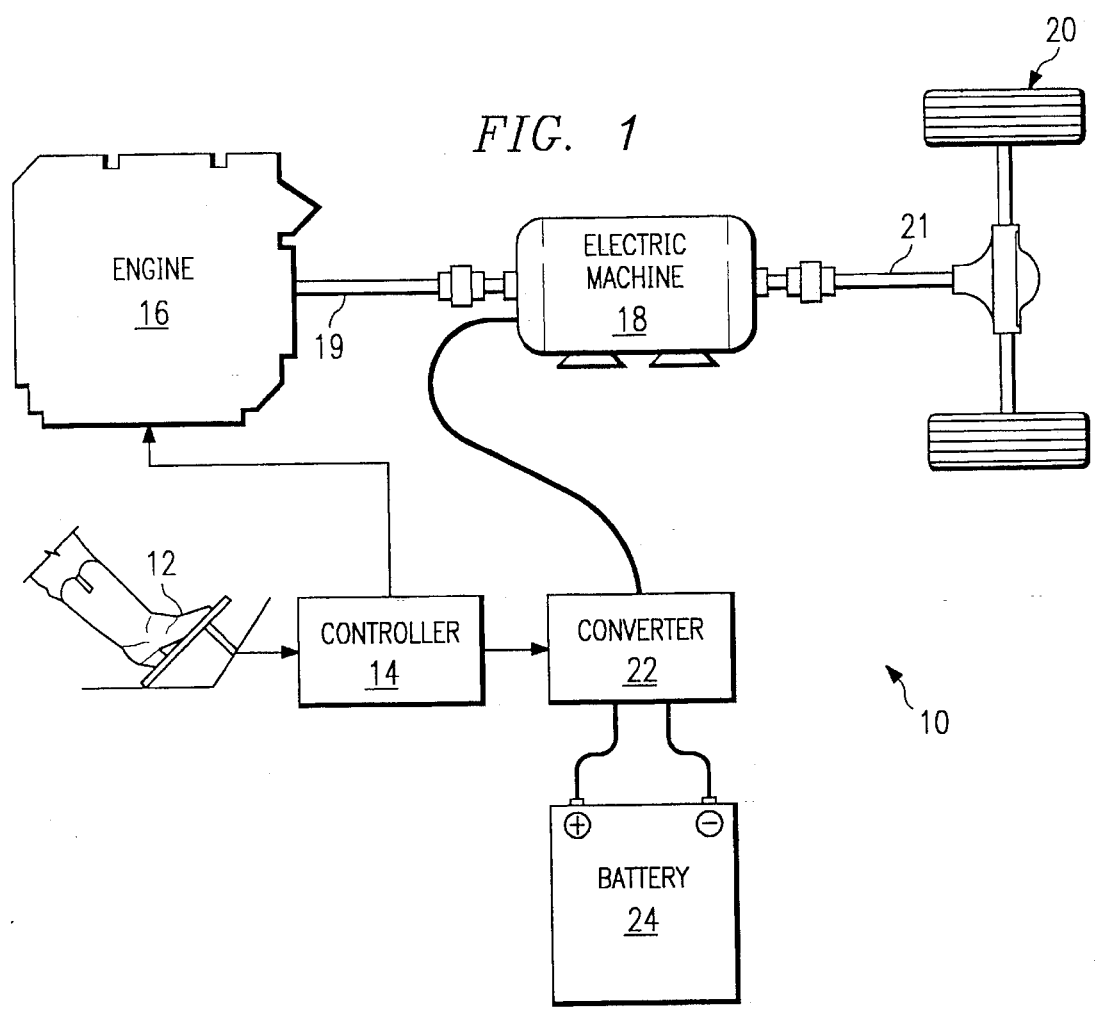
FIG. 1 illustrates an electrically peaking hybrid system constructed according to the teachings of the present invention.

FIG. 1 shows a series-mechanical hybrid electric combustion system 10 of an electrically peaking hybrid (ELPH) vehicle constructed according to the teachings of the present invention. System 10 includes command 12 which is electrically coupled to controller 14. Controller 14 is electrically coupled to engine 16 and converter 22. Engine 16 is mechanically coupled to electric machine 18 through link 19. Electric machine 18 and engine 16 are mechanically coupled through drive shaft 21 to propulsion device 20. Thus, the engine 16 is directly-mechanically coupled, in series, to the drive shaft 21 and propulsion device 20 and can directly drive the drive shaft 21. Link 19 may be considered part of drive shaft 21.

In the preferred embodiment, propulsion device 20 are the wheels of a vehicle. Electric machine 18 is also electrically coupled to converter 22. Converter 22 is also electrically coupled to battery 24. As shown in FIG. 1, the electric machine 18 is in series with the engine 16 and the drive shaft 21. Electric machine 18 could also be geared into the drive shaft 21, such that the engine 16 is still directly coupled to the drive shaft 21, but not through electric machine 18.

In system. 10, the power of engine 16 is chosen to meet the average power required by the system. Thus, engine 16 is about one-quarter the size of engines of conventional ICE vehicles. For example, for a full-size sedan, the size of the ELPH engine 16 may be about 40 horsepower.

Figure 2:
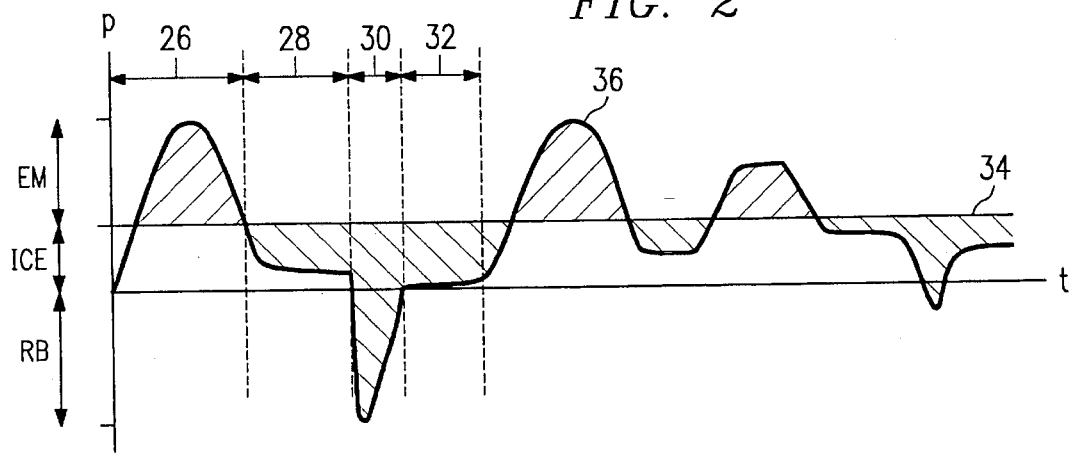
FIG. 2 illustrates typical dynamic power requirements of a vehicle as a function of time.

FIG. 2 illustrates typical dynamic power requirements for a vehicle as a function of time. Line 36 represents the "power curve," or power required by the vehicle over time. Zone 26 represents the power required by the vehicle during acceleration. Zone 28 represents the power requirement of the vehicle once it reaches its cruising speed. Zone 30 shows a sudden drop in power requirements, which occurs for example during braking. The power requirement would then remain low while the vehicle is in a full stop at zone 32. Once the vehicle starts in motion again, continuing cycles of acceleration, cruising, and stopping continue on in time for the vehicle. The average power requirement of the system 10 is shown by straight line 34. For the ELPH vehicle of the present invention, the average power level represented by line 34 is used to determine the appropriate size of the engine 16.

The system 10 has two modes of operation. In the first mode, the power requirements of the system exceed the power available from engine 16, and in the second mode the power requirements of the system are less than that being supplied by engine 16. In operation of system 10 of FIG. 1, the modes are determined by power demands on the system input by command 12. In a preferred embodiment, command 12 is an accelerator pedal, but any input mechanism may be used without departing from the intended scope of the present invention. When additional power is required by command 12, the system enters its first mode of operation when the power required by the system exceeds the power of engine 16. Controller 14 responds by requiring converter 22 to provide electrical energy from battery 24 to electric machine 18. Electric machine 18 has dual functionality to act as a motor and as a generator. In the first mode, electric machine 18 draws electrical energy from battery 24 to provide the additional required power and torque to drive shaft 21 above that delivered to the drive shaft 21 by engine 16. Converter 22 converts the DC electrical energy stored in battery 24 to AC electrical energy which is used by electric machine 18 in the first mode of operation.

In the second mode of operation of system 10, the power demands of the system are less than power provided by engine 16. Electric machine 18 performs as a generator and converts any excess mechanical energy from engine 16 to electrical energy. Converter 22 converts this AC electrical energy to DC electrical energy for storage in battery 24. In certain situations the drive shaft 21 and propulsion device 20 will also provide mechanical energy that can be converted into electrical energy for storage. For example, when the vehicle is traveling down hill, the drive train 21 will actually be driving electric machine 18, allowing for generation and storage of electrical energy.

The controller 14 controls the system such that the electric machine 18 delivers power to drive shaft 21 only at peak power requirements (thus the term peaking), that is, during the first mode of operation. During the second mode, electric machine 18 generates electrical energy for storage to the battery 24.

Engine 16 may comprise any one of many available thermal engines, such as the conventional four-stroke engine, a gas turbine, a Wankle engine, and a two-stroke engine, for example. Other thermal engines may also be used without departing from the intended scope herein. Each of these engines offers unique advantages to the overall ELPH drive which may be more or less appropriate for particular vehicles.

For example, the gas turbine is very good at fixed speeds and constant power applications. By modifying the basic ELPH architecture, the advantages of a gas turbine engine can be used in large vehicles such as tanks and personnel carriers. As another example, the two-stroke engine offers the advantage of compactness, with existing 800 CC two-cylinder units available that weigh 88 pounds and produce 54 horsepower.

Because of the widespread availability of two or four-cycle engines, and of gasoline fuel, these engines will be the least expensive in the near future. However, the use of natural gas or propane in all of the above engines can reduce their emissions by at least 50 percent. Thus, propane, natural gas and other low emission fuels are attractive fuels for the ELPH system, and will be even more attractive as their availability increases.

At the present time, the most practicable and economical choice for battery 24 is lead acid. Nickel-cadmium and nickel-iron batteries may also be used. Since the battery power is only used for peaking power demands and not for driving the vehicle continuously, its capacity and size are small when compared to existing electrical driven vehicles. Other battery systems could be used without departing from the intended of the present invention.

The electric machine 18 has the dual functionality of providing additional mechanical energy to drive shaft 21 from energy from the battery 24 in the first mode of operation (motor function), and providing electrical energy for storage in battery 24 in the second mode of operation (generator function). In the preferred embodiment, electric machine 18 is a single AC electric motor.

In the first mode of operation, mechanical power from the engine 16 is delivered to drive shaft 21. Furthermore, additional mechanical power is imparted to the drive shaft 21 by electric machine 18 from energy from battery 24. Electrical energy from battery 24 is converted to electric machine 18 from energy from battery 24. Electrical energy from battery 24 is converted to mechanical energy by the motor function of the electric machine 18. In the second mode of operation, any excess mechanical energy, whether from the drive shaft 21 or engine 16, will be converted to electrical energy by the generator function of electric machine 18. The link 19 and drive shaft 21 may be coupled directly to the rotor of the electric machine 18, or may be indirectly coupled, for example, through a clutch or transmission, as will be discussed.

Many presently available AC motors are appropriate for electric machine 18 of system 10, depending on the cost, performance and type of vehicle. For example, the squirrel cage induction motor, permanent magnet electronically commutated motor, and the variable or switched reluctance motor provide suitable alternatives for electric machine 18.

The induction motor drive is the most mature and commonly used drive for many applications. A high efficiency induction motor drive with vector controlled strategy can effectively satisfy system requirements of system 10. Permanent magnet motors have the added advantage of compactness and relatively high efficiency. A switched reluctance motor drive offers the advantages of high performance, low cost, simplicity, ruggedness and easy control. Other AC or DC motor drives may be used without departing from the intended scope of the present invention.

Because of the frame and airborne vibrational noises of having a motor in a vehicle, a motor drive control system is desirable for motor 18. To arrest these problems, both mechanical isolation and electronic harmonic cancellation may be used. Electronic harmonic noise cancellation techniques may be implemented through specific pulse with modulation (PWM) motor control strategies. For example, a PWM technique with switching angles selected to cancel lower order harmonics may be programmed into the motor drive control system.

Generally, PWM control techniques are used throughout the motor speed range to keep the harmonic noise under control. However, a six step converter wave form mode, without harmonic cancellation, is used under transient conditions, when voltage forcing is performed by the controller.

The PWM control strategy also compensates for the dead time resulting from the electric machine minimum on and off switching time. Furthermore, the switching frequency of the PWM control should be sufficiently high, relative to the transient reactance of the motor, so that the current output of the converter is sufficiently filtered. This is particularly important when a field oriented induction motor control is used. The outputs of the coordinate transformation subroutines in the field oriented motor controller should be adequately filtered by the motor reactance, without adversely affecting system bandwidth over an operating frequency range of about 30 to 1. The frequency of the PWM switching, used to eliminate all nontriplen odd harmonics up to sixty-first, at rated speed, is about 2924 hertz. This switching frequency may vary directly with motor starter frequency, except at crawl speeds. When two motors are used for front and rear wheels as in the embodiment shown in FIG. 7, the applied frequencies for the two motors are displaced in phase by 180 degrees.

In the preferred embodiment, converter 22 of system 10 is a solid state switching high power DC to AC power converter. Converter 22 has a dual function of (1) driving electric machine 18 during the first mode of operation, and (2) recharging battery 24 during the second mode of operation. Converter 22 also senses that battery 24 is fully charged in the second mode of operation of system 10 and discontinues charging battery 24. High efficiency solid state switching inverters of many kinds have been developed and are available for AC motor drives and are suitable for converter 22.

An important element of converter 22 is a solid state power switch. Several types of power switches are currently available. At present, the insulated gate bipolar transistor (IGBT) is the power device of choice for the medium frequency and medium power levels in which most applications of system 10 fall. The IGBT combines the high speed and low switching loss attributes of the gate voltage controlled unipolar field effect transistor with the low conduction losses of the base current controlled bipolar transistor. However, in the long run, MOS-controlled thyristors (MCT) may be the preferred choice, due to their conduction losses and higher voltage and gain capabilities.

An alternative for converter 22 involves the application of simple converters, which use fewer power devices, in combination with a switched reluctance motor.

Manufacture of converter 22 can be based on printed circuit board technology. This approach significantly simplifies the manufacturing of complex electronic circuits. However, the use of this technology may limit the maximum current carrying capability of the conductors to about 70 amperes. Therefore, for example, to build converters for 60 horsepower motor drives, the DC bus voltage of the converter should be about 700 volts. This is somewhat higher than the conventional currently available converter voltages of this horsepower rating. However, it requires no new or unknown techniques.

Controller 14 manages the system power by controlling engine 16, converter 22, and battery 24. Controller 14 may also monitor and control the energy used by the traction motors, coolant pump, air conditioner compressor, and other system loads in a vehicle. Controller 14 may control engine 16 through several alternative control techniques.

One technique operates engine 16 at an average power level at all times. This technique can be modified such that power level of engine 16 is decreased to a level below the average power level of the system 10 when the batteries are fully charged and the power requirements of the system are below the average power requirements. Other control techniques may also be used without departing from the intended scope herein.

For example, to meet the various acceleration and deceleration scenarios of a vehicle traveling on various roads, some learning control and fuzzy control system elements may be included in controller 14. With fuzzy logic, for example, the output of the engine 16 can be adjusted as the average power of the system changes, for example from a long highway trip to city driving. The objectives of controller 14 are to satisfy the acceleration requirements of the driver, as a conventional vehicle would, while maintaining energy balance in the charging and discharging of battery 24.

Because of the design of the present invention, battery 24 does not need external charging. For best efficiency and lowest emissions, controller 14 controls engine 16 such that it operates within a predetermined trajectory of speed and power output.

To provide good vehicle performance, maximum electric motor torque is obtainable at any speed. One approach to achieve this would be to operate the electric motor of electric machine 18 at rated rotor flux at all times. However, this also requires the maximum rated magnetizing current, which is a source of inefficiency. A motor with high magnetization reactance is desirable to reduce magnetizing current. This allows for operating the electric motor at reduced levels of flux, under normal conditions, and increasing the flux level only when higher than normal levels of torque are required. The higher levels are required, for example, during acceleration, deceleration and climbing steep grades.

During normal operation, the electric machine 18 operates at about 50% of its rated flux value. When sudden speed change is commanded by the driver, the initial speed acceleration rate is limited by controller 14 to about 50% of the maximum rate. However, at the same time, the motor flux level is ramped to its rated value. Thus, the acceleration is correspondingly increased. Once the vehicle speed reaches about 95% of the command value, the flux is allowed to relax to its original value. The option of maintaining the motor at the higher rate of the flux may be provided to the driver, for example, by a switch, so that the normal momentary degradation of acceleration can be avoided. Furthermore, the operator can have the option of boost flux at low speed operation, for emergencies.

Figure 3:
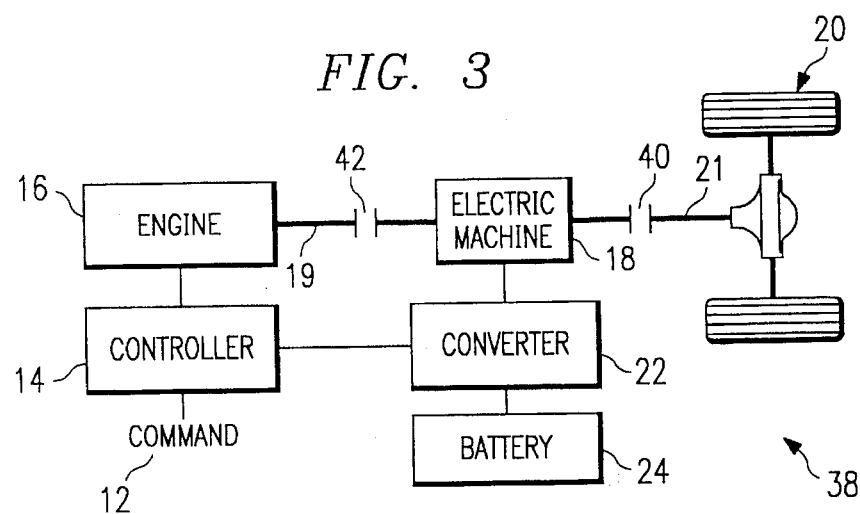
FIG. 3 illustrates an alternate embodiment of an electrically peaking hybrid system including at least one clutch.

Alternate embodiments of the present invention are shown in FIGS. 3–7. FIG. 3 shows ELPH drive 38 including clutch 40. Clutch 40 is mechanically coupled between electric machine 18 and propulsion device 20 in drive shaft 21. Clutch 40 may be a slipping or catching clutch. Clutch 40 allows for decoupling of drive shaft 21 from propulsion device 20. Clutch 40 also adds some flexibility to the speed at which engine 16 torque will be coupled to the drive shaft 21. Furthermore, with the presence of clutch 40, the engine 16 can continue to charge battery 24 or idle, while the vehicle is at a stop. Additional clutch 42 can be added between engine 16 and electric machine 18. Clutch 42 provides the flexibility of driving the vehicle temporarily from the electrical system only, for example, during emergencies. Clutch 42 may comprise a catching or slipping clutch.

Figure 4:
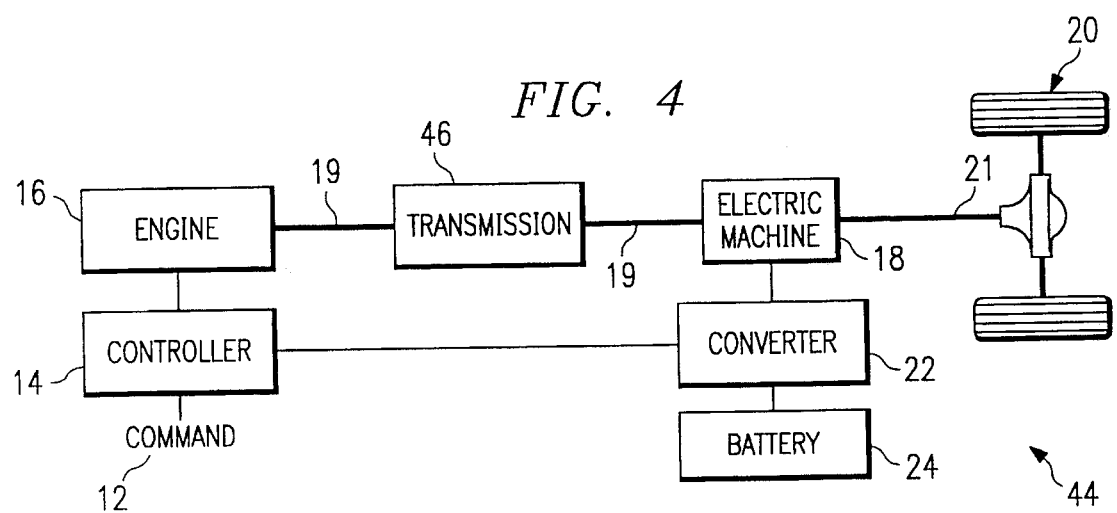
FIG. 4 illustrates an alternate embodiment of an electrically peaking hybrid system including a transmission.

FIG. 4 illustrates an alternate embodiment, ELPH system 44, with transmission 46. In this embodiment, transmission 46 is mechanically coupled between engine 16 and the electric machine 18. Transmission 44 gives ELPH system 44 the ability of uncoupled speeds between drive shaft 21 and engine 16. In this embodiment, a nearly constant speed gas turbine can be used for engine 16, which may be desirable for very high power vehicles, such as tanks and personnel carriers.

Figure 5:
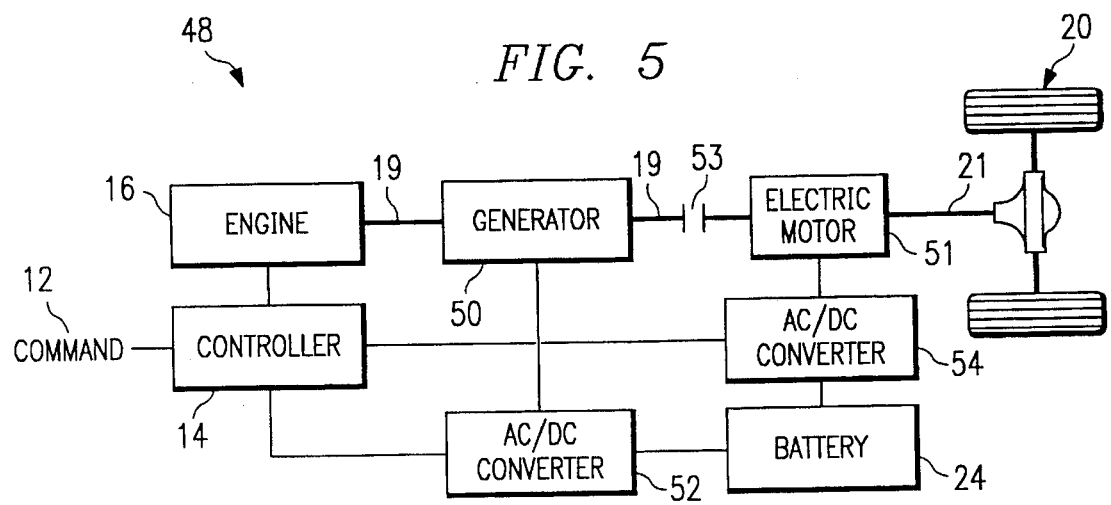
FIG. 5 illustrates an alternate embodiment of the present invention where the electric machine functions of electric propulsion and battery charging are divided between two electric machines.

FIG. 5 illustrates an alternate embodiment, ELPH system 48, in which electric machine 18 comprises separate generator 50 and electric motor 51, and converter 22 comprises first converter 52 and second converter 54. In the embodiment, ELPH system 48 also includes clutch 53 mechanically coupled between generator 50 and electric motor 51. Furthermore, generator 50 is mechanically coupled to engine 16 and electric motor 51. Generator 50 is also electrically coupled to first converter 52. First converter 52 is an AC to DC converter. First converter 52 is also electrically coupled to controller 14 and battery 24. Second converter 54 is electrically coupled to controller 14, electric motor 51 and battery 24.

In operation of this embodiment, generator 50 can be much smaller than electric motor 51 because it only provides steady state charging at a much lower level than the peaking power of electric motor 51. This allows charging of battery 24 even during idling of engine 16. Furthermore, engine 16 can be started by generator 50, while it is disengaged from the drive shaft 21 by clutch 51.

Figure 6:
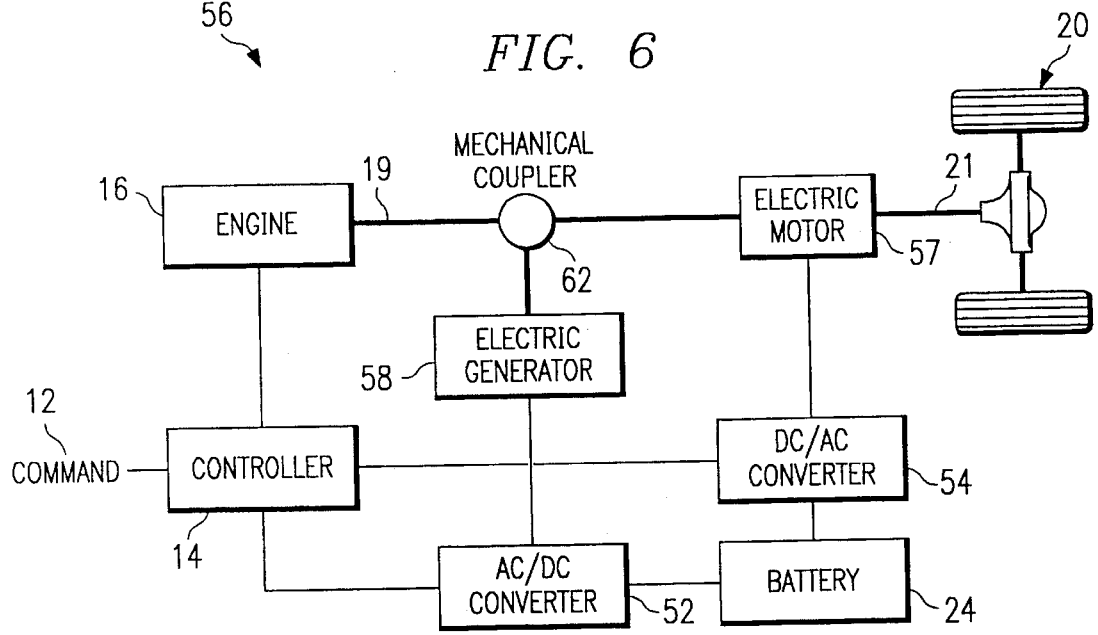
FIG. 6 illustrates an alternate embodiment of the present invention where the engine, electric motor, and electric generator are decoupled and operate at separate speeds.

Referring to FIG. 6, an alternate embodiment of the present invention, ELPH drive system 56, is depicted. In this embodiment, mechanical coupler 62 is mechanically coupled to engine 16 and electric motor 57. Additionally, electric generator 58 is mechanically coupled to mechanical coupler 62 and first converter 52. Also, second converter 54 is electrically coupled to controller 14, electric motor 53 and battery 24.

In operation, decoupling of separate generator 58 and electric motor 57 through mechanical coupler 62 allows for maintaining different torque and speed at engine 16 and drive shaft 21. Mechanical coupler 62 between engine 16 and motor 57 and generator 58 allows each of these respective shafts to run at different speeds. Thus, in this embodiment of the present invention, engine 16 could be a high speed gas turbine or a piston engine, running at a constant speed, while drive shaft 21 and the shaft of generator 58 are running at slower speeds to meet the needs of the vehicle. This is useful in large military vehicles such as tanks, which require large amounts of mechanical energy and also have very large electrical loads, such as on-board weapon systems.

Figure 7:
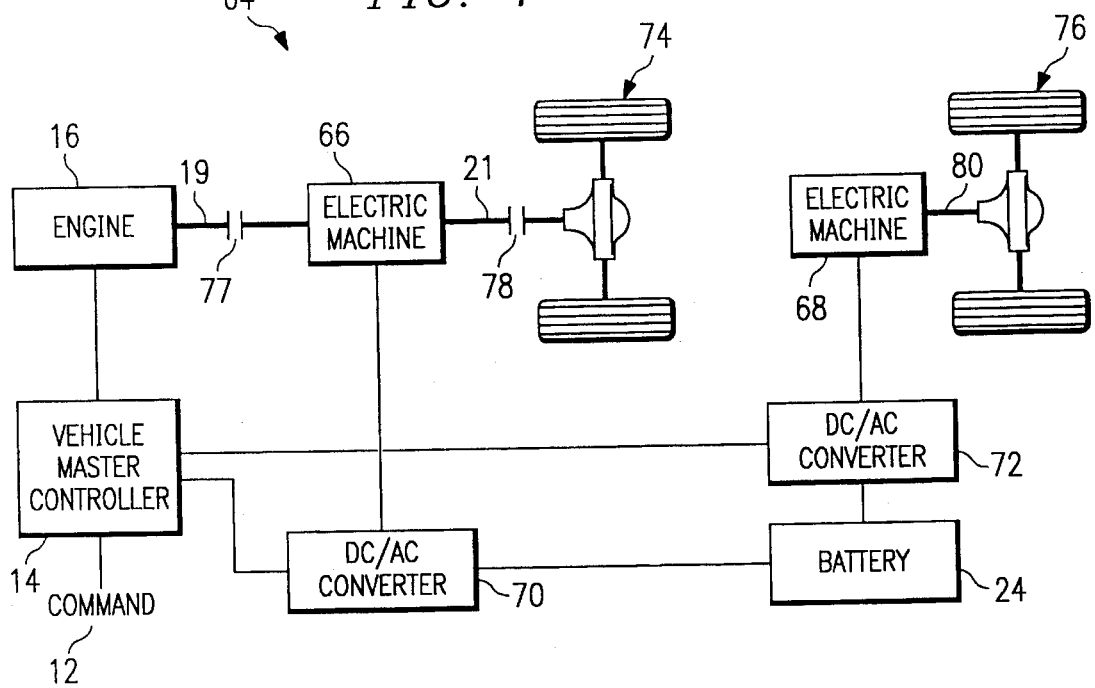
FIG. 7 illustrates an alternate embodiment of the present invention where the electric motor is divided into two motors and placed on each of the individual drive trains to provide all wheel drive.

Shown in FIG. 7 is an embodiment of the present invention in which an ELPH drive system 64 is appropriate for an all-wheel drive vehicle. In this embodiment, there is a first electric machine 66 and a second electric machine 68, as well as a first converter 70 and a second converter 72. First electric machine 66 is mechanically coupled between the engine 16 and the first propulsion device 74. First electric machine 66 is also electrically coupled to first converter 70. Second electric machine 68 is also mechanically coupled to second propulsion device 76 through drive shaft 80 and to second converter 72. Second electric machine 68 drives second propulsion device 78 and second converter 72. This embodiment provides the benefit of independent two-wheel or four-wheel drive and traction for the ELPH vehicle. Furthermore, drive shaft 80 may be coupled to drive shaft 21, to allow for driving of propulsion device 76 by engine 16. Clutches 77 and 78 may also be included.

Although the present invention has been described in detail, it should be understood that various changes, substitutions and alterations can be made hereto without departing from the spirit and scope of the invention as defined by the appended claims.

What is claimed is:

1. A hybrid electric-combustion vehicle drive system, comprising:

an engine operable to generate mechanical energy, said engine mechanically coupled to a drive mechanism;

a battery operable to store electrical energy and to deliver electrical energy;

an electric machine mechanically coupled to said engine and said drive mechanism, and electrically coupled to said battery, said electric machine operable to translate electrical energy from said battery into additional mechanical energy at said drive mechanism in a first mode of operation and to translate mechanical energy from said engine and said drive mechanism to electrical energy and to deliver the electrical energy to charge said battery in a second mode of operation; and a controller coupled to said engine and said electric machine operable to monitor said engine and said electric machine over a period of time, said controller being further operable to adjust the power level of said engine such that for each of a plurality of different operating conditions said engine operates at a determined average required power level of the system when said battery is a partially charged condition and to operate said engine at a power level below the determined average required power level of the system when said battery is in a fully charged condition, the first mode of operation being entered when system power requirements exceed a selected operating power level of the engine and the second mode of operation being entered when system power requirements are less than a selected operating power level of the engine, said controller being further operable to control the delivery of electrical energy from said electrical machine to said battery.

2. The system of claim 1, wherein one of said operating conditions is highway driving.

3. The system of claim 1, wherein one of said operating conditions is city driving.

4. The system of claim 1, wherein said controller includes fuzzy logic for determining said average required power level of the system.

5. A method of generating hybrid electric-combustion power in a vehicle propulsion system, comprising the steps of:

generating mechanical energy in an engine mechanically coupled to an electric machine;

translating the mechanical energy from the engine directly through the electric machine to a drive mechanism for propulsion;

translating excess mechanical energy from the engine to electrical energy with the electric machine;

translating excess mechanical energy from the drive mechanism to electrical energy with the electric machine;

translating electrical energy from a battery through the electric machine for propulsion during a first mode of operation;

delivering electrical energy from the electric machine to charge the battery in a second mode of operation;

monitoring the engine and electric machine energy over a period of time to determine the average required power level of the engine; and adjusting the power level of the engine such that for each of a plurality of different operating conditions the engine operates at a determined average required power level of the system when the battery is in a partially charged condition and operating the engine at a power level below the determined average required power level of the system when the battery is in a fully charged condition, the first mode of operation being entered when system power requirements exceed a selected operating power level of the engine and the second mode of operation being entered when system power requirements are less than a selected operating power level of the engine, and further controlling the delivery of electrical energy from the electrical machine to the battery.

6. The method of claim 5, wherein one of the operating conditions is highway driving.

7. The method of claim 5, wherein one of the operating conditions is city driving.

8. The method of claim 5, wherein the average required power level of the system is determined through fuzzy logic rules.

\* \* \* \* \*